(12) United States Patent
Chen et al.

(10) Patent No.: US 9,200,155 B2
(45) Date of Patent: Dec. 1, 2015

(54) WATER REDISPERSIBLE EPOXY POLYMER POWDER AND METHOD FOR MAKING THE SAME

(75) Inventors: Liang Chen, Midland, MI (US); Liang Hong, Midland, MI (US); Manesh N. Sekharan, Midland, MI (US); Michael J. Radler, Saginaw, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/127,244

(22) PCT Filed: Jun. 13, 2012

(86) PCT No.: PCT/US2012/042114
§ 371 (c)(1),
(2), (4) Date: Dec. 18, 2013

(87) PCT Pub. No.: WO2012/177448
PCT Pub. Date: Dec. 27, 2012

(65) Prior Publication Data
US 2014/0113992 A1   Apr. 24, 2014

Related U.S. Application Data

(60) Provisional application No. 61/500,167, filed on Jun. 23, 2011.

(51) Int. Cl.
*C08L 63/00*   (2006.01)
*C08J 3/12*   (2006.01)

(52) U.S. Cl.
CPC ............... *C08L 63/00* (2013.01); *C08J 3/122* (2013.01); *C08J 3/126* (2013.01); *C08J 2363/00* (2013.01); *C08J 2433/06* (2013.01)

(58) Field of Classification Search
CPC ................... C08L 63/00; C08J 3/126
See application file for complete search history.

(56) References Cited

U.S. PATENT DOCUMENTS

| | | | |
|---|---|---|---|
| 4,028,294 A | 6/1977 | Brown et al. | |
| 4,123,403 A | 10/1978 | Warner et al. | |
| 4,308,185 A * | 12/1981 | Evans et al. | 523/423 |
| 4,522,962 A | 6/1985 | Abbey et al. | |
| 4,916,171 A | 4/1990 | Brown et al. | |
| 5,190,994 A | 3/1993 | Buter et al. | |
| 5,403,894 A | 4/1995 | Tsai et al. | |
| 5,594,563 A | 1/1997 | Larson | |
| 5,686,511 A * | 11/1997 | Bobo | 523/412 |
| 5,830,952 A * | 11/1998 | Pedersen et al. | 525/531 |
| 5,942,563 A | 8/1999 | DeGraaf | |
| 5,959,029 A | 9/1999 | Koelliker et al. | |
| 5,981,627 A | 11/1999 | Shih et al. | |
| 6,346,353 B1 * | 2/2002 | Wang et al. | 430/14 |
| 6,806,308 B2 * | 10/2004 | Zajac | 524/522 |
| 2001/0024644 A1 | 9/2001 | Kohlhammer et al. | |
| 2010/0197831 A1 | 8/2010 | Faatz et al. | |

FOREIGN PATENT DOCUMENTS

EP   0723975 A1   7/1996

* cited by examiner

*Primary Examiner* — Vickey Nerangis
(74) *Attorney, Agent, or Firm* — Andrew Merriam

(57) ABSTRACT

An aqueous dispersion of epoxy resin and a redispersible epoxy polymer powder contains particles of 50-90 weight-percent epoxy resin with 10-50 weight-percent alkali soluble shell around the particles and 2-25 weight-percent dispersing aid, with weight-percent based on total combined weight of epoxy resin, alkali soluble polymer shell and dispersing aid.

14 Claims, No Drawings

WATER REDISPERSIBLE EPOXY POLYMER POWDER AND METHOD FOR MAKING THE SAME

BACKGROUND OF THE INVENTION

1. Field of the Invention

The present invention relates to a method for making a water redispersible epoxy polymer powder and the resulting water redispersible epoxy polymer powder and dispersions of epoxy polymer particles.

2. Description of Related Art

Water redispersible polymer (RDP) powders are dry powders of polymer particles that upon mixing with an aqueous fluid dissociate and form a polymer dispersion in the aqueous fluid. Water RDP powders of polymeric binders are valuable additives in dry formulations of cementitious materials such as mortar, grout and concrete for the purpose enhancing final properties of the resulting material. Epoxies, for example, are desirable additives in cementitious formulation to increase toughness, reduce water permeability and/or increase chemical and stain resistance in cementitious materials. Epoxies can be added to a cementitious formulation as a liquid dispersion. However, it is desirable to include epoxy additives in the form of a water RDP powder to dry cement formulations for convenience in shipping, formulating and handling. RDP powders of epoxy resins are not well known despite a desire for such a material. Those RDP powders containing epoxy resins that do contain epoxy polymer comprise a minor amount (50 wt % or less) of epoxy resin blended into another polymer (typically emulsion polymerized) polymer.

United States published patent application 20100197831A1 discloses a water redispersible powder of a polymer combination that comprises up to 50 wt % epoxy polymer. The polymer powder is prepared by emulsion polymerizing a non-epoxy polymer, then adding epoxy resin to the emulsion polymer and isolating the resulting polymer blend particles as a powder.

United States published patent application 2001/0024644 discloses a method for preparing a dispersion of polymer particles by emulsion polymerization of monomers, up to 10 percent by weight of which can contain epoxy functionality and incorporating into the emulsion particles up to 50 wt % of an non-copolymerizable difunctional epoxy. The resulting emulsion particles can be isolated to form a water redispersible polymer powder.

European patent application EP723975A1 discloses a water redispersible polymer powder that comprises a copolymer that contains up to 50 percent by weight of epoxide-group containing ethylenically unsaturated comonomer.

Lacking from these references is a method for forming a RDP powder that contains greater than 50 wt % epoxy resin based on RDP particle weight. Such a RDP powder would be desirable for concentrated delivery of epoxy resin in dry powder form. Further lacking from these references is a method forming a RDP powder that contains greater than 50 wt % epoxy resin based on RDP powder particle weight where the epoxy resin has a glass transition temperature below the temperatures at which it is isolated as a RDP powder or even more below temperatures at which is it used, or a method for preparing such a RDP powder. Such RDP powders would be highly desirable for concentrated delivery and quick dissociation of epoxy into cementitious formulations.

BRIEF SUMMARY OF THE INVENTION

The present invention provides an advancement over known art by surprisingly providing a process for preparing an epoxy RDP powder (or simply "epoxy RDP") having the aforementioned desirable features. In particular, the process of the present invention has overcome process challenges with preparing an epoxy RDP that contains greater than 50 wt % epoxy resin based on total epoxy RDP particle weight by, for example, discovering suitable combinations of types and concentrations of dispersing aids and shell forming polymer to allow for formation of the RDP. Moreover, a desirable embodiment of the present invention further provides a process that enables formation of such an epoxy RDP where the epoxy is a liquid at the temperatures at which it is isolated as an RDP. Still more, the process of the present invention provides a method for preparing such epoxy RDPs so as to be stable during isolation and redispersing but that readily release the epoxy for use as a binder when formulated in a cementitious formulation. These accomplishments are in part due to a surprising discovery that it is possible to create an alkali soluble shell around dispersed resin particles without a need to first forming emulsion polymerized seed latex to dissolve the epoxy resin into in order to get dispersed resin particles. Further discovery is how to create an alkali soluble shell around the epoxy particles that is capable of protecting the epoxy resin from diffusing between particles during spray drying and storage as a RDP powder but is capable of releasing the epoxy when formulated in an alkali environment such as a cementitious formulation.

In a first aspect, the present invention is an aqueous redispersible epoxy polymer powder comprising epoxy resin particles, the epoxy resin particles comprising: (a) epoxy resin; (b) an alkali soluble polymer shell around each epoxy resin particles, the alkali soluble polymer shell comprising a polymer made of at least five weight-percent and forty weight-percent or less of monomers selected from carboxylic acid monomers and anhydride monomers based on total weight of monomers polymerized to form the alkali soluble polymer shell and the alkali soluble polymer shell having a glass transition temperature of at least 60 degrees Celsius as calculated by the Fox equation; and (c) a dispersing aid; wherein the epoxy resin is present at a concentration of greater than fifty weight-percent and ninety weight-percent or less, the alkali soluble polymer shell is present at a concentration in a range of ten to fifty weight-percent and the dispersing aid is present at a concentration of two to twenty-five weight-percent with weight-percents of epoxy resin, alkali soluble polymer shell and dispersing aid being based on the combined total weight of epoxy resin, alkali soluble polymer shell and dispersing aid such that the combined weight percents of each of these three components is 100 weight-percent.

In a second aspect, the present invention is a method for preparing the aqueous dispersible epoxy polymer powder of the first aspect, the method comprising: (a) dispersing an epoxy resin into an aqueous phase to form an initial epoxy resin dispersion of epoxy resin particles that contain more than 50 weight-percent epoxy resin by weight of the epoxy resin particles; (b) introducing so as to be present in the initial epoxy dispersion during the polymerization step (c) a selection of unsaturated monomers at any point or combination of points prior to or concurrent with the following polymerization step (c), wherein at least five weight-percent and 40 weight-percent or less of the unsaturated monomers are selected from carboxylic acid monomers and anhydride monomers; (c) feeding a free radical initiator into the initial epoxy resin dispersion and subjecting the dispersion, free radical initiator and monomers to conditions that result in free radical polymerization while stirring so as to polymerize the unsaturated monomers into an alkali soluble polymer shell around each epoxy resin particle; and (d) removing the aqueous phase from the epoxy resin particles having an alkali soluble polymer shell to obtain an aqueous redispersible epoxy polymer powder; wherein: (i) a dispersing aid is added to the epoxy resin or dispersion at one or more point before or during any of steps (a)-(d); (ii) the unsaturated monomers in step (b) are selected so that the resulting polymer forming the alkali soluble polymer shell has a glass transition temperature as calculated by the Fox equation of at least 60 degrees Celsius; and (iii) the amounts of epoxy resin, unsaturated monomers and dispersing aid are selected so that the resulting aqueous redispersible epoxy polymer powder has a concentration of epoxy resin that is greater than 50 weight-percent and 90 weight-percent or less; a concentration of alkali soluble polymer shell in a range of ten to fifty weight-percent; and a total of from two to 25 weight-percent of a dispersing aid where the concentration of epoxy resin, alkali soluble polymer shell and dispersing aid are each relative to total combined weight of epoxy resin, alkali soluble polymer shell and dispersing aid such that the combined weight-percents of epoxy resin, alkali soluble polymer shell and dispersing aid is 100 weight-percent.

In a third aspect, the present invention is a dispersion of the aqueous redispersible epoxy polymer powder of the first aspect, the dispersion comprising epoxy particles comprising epoxy resin particles dispersed in an aqueous solution, where the epoxy resin particles comprise: (a) epoxy resin; (b) an alkali soluble polymer shell around each epoxy resin particles, the alkali soluble polymer shell comprising a polymer made of at least five weight-percent and forty weight-percent or less of monomers selected from carboxylic acid monomers and anhydride monomers based on total weight of monomers polymerized to form the alkali soluble polymer shell and the alkali soluble polymer shell having a glass transition temperature of at least 60 degrees Celsius as calculated by the Fox equation; and (c) a dispersing aid; wherein the epoxy resin is present at a concentration of greater than fifty weight-percent and ninety weight-percent or less, the alkali soluble polymer shell is present at a concentration in a range of ten to fifty weight-percent and the dispersing aid is present at a concentration of two to twenty-five weight-percent with weight-percents of epoxy resin, alkali soluble polymer shell and dispersing aid being based on the combined total weight of epoxy resin, alkali soluble polymer shell and dispersing aid such that the combined weight percents of each of these three components is 100 weight-percent.

The process of the present invention is useful for making the epoxy RDP of the present invention. The epoxy RDP of the present invention is useful for formulating epoxy binder into cementitious formulations as a dry blendable component. The dispersions of the present invention are useful both as an intermediary step in the method of making the epoxy RDP of the present invention and, more generally, as a binder compositions.

DETAILED DESCRIPTION OF THE INVENTION

"ASTM" refers to ASTM International and is used to designate a test method by number as published by ASTM. "ISO" refers to International Organization for Standardization and is used to identify ISO test method numbers. Test numbers refer to the most recent test published prior to the priority date of this document unless otherwise specified by a date using a hyphenated suffix after the test number. "Multiple" means two or more. "And/or" means "and, or as an alternative". All ranges include endpoints unless otherwise indicated.

"Glass transition temperature" or "Tg" of a material refers to the glass transition temperature value as determined by ASTM D7426-08 using a heating and cooling rate of 10° C. per minute.

Particle size for particles in a dispersion herein are given in term of mean volume-average particle size as determined by laser diffraction according to ISO 13320-2009 using a Coulter Counter particle size and count analyzers.

Herein, "total epoxy RDP particle weight" is interchangeable with "combined weight of epoxy resin, alkali soluble polymer shell and dispersing aid in an epoxy RDP particle."

Aqueous Redispersible Epoxy Polymer Powder ("Epoxy RDP")

The present invention provides a new epoxy RDP that satisfies a need in providing a high concentration of epoxy resin in dry redispersible powder form. The epoxy RDP is designed to be particularly useful as a binder additive for cementitious formulations. The design of epoxy RDP is to have a protective alkali soluble polymer shell around each epoxy particle to protect the epoxy particles from irreversible agglomeration resulting from epoxy resin from diffusing between particles until in an alkali formulation. The epoxy RDP comprises epoxy resin particles that comprise epoxy resin, an alkali soluble polymer shell around each particle and a dispersing aid.

The epoxy resin is present at a concentration of greater than 50 weight-percent (wt %), preferably 65 wt % or greater, still more preferably 75 wt % or greater and can be present at a concentration of 85 wt % or greater and is at a concentration of 90 wt % or less based on total epoxy RDP particle weight. Such a high concentration of epoxy resin is unprecedented in any RDP powder known to the inventors of the present epoxy RDP.

The glass transition temperature (Tg) of the epoxy resin is not a restriction in the broadest scope of the present invention. However, the epoxy resin typically will have a Tg of 100 degrees Celsius (° C.) or lower, preferably 90° C. or lower, still more preferably 75° C. or lower, even more preferably 50° C. or lower. Lower Tg epoxy resins are desirable because they diffuse more quickly when distributed in a formulation as a binder and because they are film forming at lower temperatures, even room temperature or below, relative to higher Tg epoxy resins. However, lower Tg resins are more challenging to isolate as a RDP because they tend to diffuse more easily between RDP particles and cause irreversible agglomeration of the particles which precludes effective redispersibility of the epoxy powder. This is a particular challenge for epoxy resins that are in liquid form during formation of the RDP, during storage of the RDP, and most challenging is when the epoxy resin is liquid both during formation and storage of the RDP. The challenge is accentuated in the epoxy RDPs of the present invention by the relatively high concentration of epoxy resin in the epoxy RDP particles. Diffusion of epoxy resin between particles is believed to be one reason why epoxy resin concentrations in the range of the present invention are unknown in RDP form. One of the surprising aspects of the present invention is that the epoxy resin in the epoxy RDP can have a Tg of 25° C. or lower, even 20° C. or lower, even 0° C. or lower and as such can be a liquid epoxy resin during formation of the epoxy RDP as well as storage of the epoxy RDP while maintaining redispersibility of the particles even at the high epoxy resin concentration of the present epoxy RDP particles. Generally, the Tg of the epoxy resin is −40° C. or greater primarily because commercially available epoxy resins tend to have a Tg above this value.

Suitable epoxy resins for use in the present invention include aliphatic, araliphatic and aromatic epoxy compounds.

Epoxy resins with aromaticity are particularly desirable because they are more readily available and tend to have more desirable chemical and physical properties. Epoxy resins are free from ethylenic unsaturation that would subject the resin to free radical polymerization. Epoxy resins have at least two epoxide groups per molecule. Particularly desirable epoxy resins for use in the present invention include condensates of bisphenol A and epichlorohydrin or methylepichlorohydrin ("Bisphenol A-type resins") and epoxy resins based on bisphenol F that generally contain a mixture of bisglycidyloxyphenylmethanes ("Bisphenol F-type resins"). The epoxy resin can be and desirably is free of sulfur.

The particles of epoxy resin in the epoxy RDP further comprise an alkali soluble polymer shell around the epoxy resin. The alkali soluble shell is believed to serve multiple purposes. It is believed that the alkali soluble shell serves to shield epoxy resin from diffusing from one particle to another and thereby precludes irreversible agglomeration of particles. Because the shell is strategically located around the particle rather than blended with the epoxy resin in the particle, the particles can contain a much lower concentration of shell (and, hence, much higher concentration of epoxy resin) than in the epoxy RDP particles of current art comprising epoxy resin blended into emulsion polymerized particles. The alkali soluble polymer shell further serves as a means for releasing the epoxy when the epoxy is desired for use as a binder in a cementitious (or other alkali) formulation. Upon dispersing the epoxy RDP particles of the present invention into an aqueous alkali composition the alkali soluble shell weakens to release the epoxy resin to diffuse into the composition.

The alkali soluble shell is a polymeric shell around the epoxy resin core of a particle that forms a barrier to dissociation or diffusion of the epoxy resin out from the particle until the particles are exposed to base (alkali). The alkali soluble shell has acid functionality when acting as a barrier to epoxy diffusion. Upon exposure to a base, the acid functionality is neutralized causing the shell polymer in aqueous solution to swell and desirably dissolve to some extent thereby weakening the shell polymer's barrier properties protecting the epoxy resin core. As a result, exposure to base weakens or even eliminates the barrier properties of the shell and can cause release of the epoxy resin in the core to, for example, act as a binder in the alkali solution. Preferably 0.8 to 1.5 equivalents of base are used to sufficiently neutralize the acid functionalities on the shell and trigger swelling and/or dissolution of the shell polymer in aqueous solution.

In order to achieve its alkali soluble property, the alkali soluble polymer shell comprises a polymer made of at least five wt %, preferably ten wt % or more, still more preferably 15 wt % or more and yet more preferably 20 wt % or more of monomers selected from carboxylic acid monomers and anhydride monomers based on total weight of monomers polymerized to form the alkali soluble polymer shell. At the same time, the alkali soluble polymer shell has 40 wt % or less, preferably 30 wt % or less of copolymerized monomer selected from carboxylic acid and anhydride monomers based on total weight of monomers polymerized to form the alkali soluble polymer shell. Suitable carboxylic acid monomers include methyacrylic acid, acrylic acid, itaconic acid, maleic acid and fumaric acid while methacrylic acid is most preferable. Suitable anhydride monomers include methacrylic anhydride, maleic anhydride and itaconic anhydride. Desirably, the selection of carboxylic acid and anhydride monomers includes or consists of carboxylic acid monomers and most preferably includes or consists of methacrylic acid.

The remaining monomers copolymerized to form the alkali soluble polymer shell are desirably selected from a group consisting of methyl acrylate, ethyl acrylate, butyl acrylate, 2-ethylhexyl arylate, decyl acrylate, methyl methacrylate, ethyl methacrylate, butyl methacrylate, acrylic acid, methacrylic acid, itaconic acid, maleic acid, fumaric acid, styrene, substituted styrene, acrylonitrile, vinyl acetate, other alkyl acrylates having from one to twelve carbon alkyl groups. The monomers are selected to form an alkali soluble polymer shell having a glass transition temperature (Tg) of 60° C. or higher, preferably 75° C. or higher, still more preferably 90° C. or higher, even more preferably 100° C. or higher as calculated using the Fox equation. It is desirable for the alkali soluble polymer shell to have a high Tg to resist irreversible agglomeration of particles during isolation of the epoxy RDP particles, particularly in the presence of components such as dispersing aids that might plasticize the alkali soluble polymer shell to some degree. Calculate the Tg of the alkali soluble polymer shell using the Fox equation:

$$1/(Tg_{copolymer}) = \Sigma(wf_i/Tg_i)$$

where $Tg_{copolymer}$ is the Tg of the alkali soluble polymer shell copolymer, $wf_i$ is the weight-fraction of monomer "i" in the alkali soluble polymer shell copolymer and $Tg_i$ is the glass transition temperature of a homopolymer made from monomer "i" and the summation is over all monomers "i".

The alkali soluble polymer shell desirably has a weight-average molecular weight of 2,500 grams per mole (g/mol) or more, preferably 5,000 g/mol or more and at the same time desirably has a weight average molecular weight of 500,000 g/mol or less, generally 250,000 g/mol or less and typically 100,000 g/mol or less. Determine weight average molecular weight of the alkali soluble polymer shell by gel permeation chromatography.

One desirably alkali soluble polymer shell is a copolymer of 5 to 40 wt % of monomers selected from carboxylic acids and anhydrides, 30 to 95 wt % of monomers selected from alkyl acrylate, alkyl methacrylate and styrene, and zero to 30 wt % of a hydroxyalkyl ester of a carboxylic acid or acrylamide or methacrylamide with wt % based on total monomers copolymerized to form the alkali soluble polymer shell copolymer.

Particularly desirable alkali soluble polymer shells comprise, even consist of copolymers of methacrylic acid and methyl methacrylate. In such a copolymer, the concentration of copolymerized methacrylic acid is desirably 5 wt % or more, preferably 10 wt % or more, still more preferably 15 wt % or more and even more preferably 20 wt % or more while at the same time desirably being 60 wt % or less, preferably 50 wt % or less and typically 40 wt % or less. The balance of the copolymer is copolymerized methyl methacrylate.

The alkali soluble shell is primarily located around the surface of the epoxy RDP particles and as such efficiently protects the epoxy resin within the particles. As such, the concentration of alkali soluble shell can be equal to or less than the concentration of epoxy resin and still preclude irreversible agglomeration of the epoxy RDP particles. The alkali soluble shell is typically present at a concentration of less than 50 wt %, preferably 40 wt % or less, more preferably 30 wt % or less, even more preferably 25 wt % or less and at the same time is desirably present at a concentration of ten wt % or more, preferably 15 wt % or more and still more preferably 20 wt % or more relative to the total epoxy RDP particle weight.

A dispersing aid is present with the epoxy RDP. Dispersing aids are materials that facilitate dispersion of one or more material into another. In the case of the present invention, the dispersing aid facilitates dispersing an oil phase in an aqueous phase. In particular, the dispersing aid facilitates dispersing epoxy resin particles in an aqueous phase. Dispersing aids can be useful in the process of the present invention for preparing the epoxy RDP. Alternatively, or additionally, dispersing aids can be useful as an additive in with the epoxy RDP to facilitate redispersing of the epoxy particles in an aqueous solution. Suitable dispersing aids include surfactants (anionic, cationic and/or nonionic). The most desirable dispersing aid is polyvinyl alcohol (PVOH), preferably a partially hydrolyzed PVOH. Other dispersing aids that are suitable in addition to PVOH or as an alternative to PVOH include cellulose derivatives such as hydroxypropyl cellulose; polymers of methyl vinyl ether; poly vinyl pyrolidone; and copolymers of monomeric acids such as acrylic acid. Desirably, the dispersing aid contains less than 5 wt % amount of surfactants containing ethylene oxide groups because such surfactants can interfere with the protective nature of the alkali soluble shell.

The dispersing aid is present in the epoxy RDP at a concentration of 2 wt % or more, preferably 5 wt % or more, still more preferably 7 wt % or more and can be present at a concentration of 10 wt % or more while at the same time is generally present at a concentration of 25 wt % or less, preferably 20 wt % or less, and more preferably 15 wt % or less with wt % relative to total epoxy RDP particle weight.

A particularly desirable RDP of the present invention comprises, or even consists of PVOH as a dispersing aid at a concentration of 5 wt % or more, preferably 7 wt % or more and can be present at a concentration of 10 wt % or more while at the same time is desirably present at a concentration of 20 wt % or less, preferably 15 wt % or less relative to total epoxy RDP particle weight.

The redispersible characteristic of an aqueous redispersible polymer powder means the epoxy RDP is capable of dispersing in an aqueous medium to form a dispersion of fine particles, which is also a dispersion of the present invention. This is in contrast, for example, to a powder of irreversibly agglomerated particles that are incapable of redispersing into fine particles. The epoxy RDP of the present invention forms a dispersion of epoxy particles having a particle size of five micrometers or less, preferably two micrometers or less, still more preferably one micrometer or less, even more preferably less than one micrometer, and yet more preferably 750 nanometers or less and can be 500 nanometers or less when dispersed in an aqueous medium (preferably water) at a pH in a range of 9-11. Notably, the pH of the dispersion formed does not necessarily fall in a pH range of 9-11 but rather there should be sufficient base present in the initial aqueous medium to neutralize acid in the alkali soluble shell of the epoxy RDP particles to ensure efficient redispersion. There is no known lower limit for the epoxy particle size for the redispersed epoxy RDP particles of the present invention yet the particles generally have a particle size greater than one nanometer and more typically 10 nanometers or larger.

Notably, the epoxy RDP of the present invention in its dry non-redispersed form can have an epoxy particle size that appears larger than the epoxy particle size of the redispersed epoxy particles. In powder form epoxy particles tend to associate with one another to form clusters of particles. A beneficial feature of the present invention is that these clusters of particles dissociate in an aqueous solution to allow redispersion in to a dispersion of fine particles rather than remaining irreversibly agglomerated together.

An anti-caking agent is often dispersed with the epoxy RDP of the present invention. Anti-caking agents are useful when spray drying an epoxy dispersion to isolate the epoxy particles. Typical anti-caking agents include mineral filler such as calcium carbonate, kaolin, barium sulphate, titanium oxide, talc, hydrated alumina, bentonite, calcium sulphoaluminate and silica. The concentration of anti-caking agent in the epoxy RDP is typically 50 wt % or less, preferably 20 wt % or less, more preferably 15 wt % or less, still more preferably 10 wt % or less and even more preferably 5 wt % or less relative to total epoxy RDP weight. The epoxy RDP can be free of anti-caking agent, but generally contains 0.5 wt % or more, preferably 2 wt % or more and more preferably 5 wt % or more relative to total epoxy RDP weight.

A particularly desirable epoxy RDP of the present invention is characterized by comprising an epoxy resin having a glass transition temperature of −40° C. to 50° C. (which can be inclusive or exclusive of the 50° C. value), an alkali soluble polymer shell comprising a polymer consisting of polymerized monomers selected from a group consisting of acrylates, ethylacrylate, butyl acrylates, 2-ethylhexyl acrylate, decyl acrylates, methyl methacrylate, ethyl methacrylate, butyl methacrylate, acrylic acid, methacrylic acid, itaconic acid, maleic acid, and fumaric acid and selected so that the alkali soluble shell polymer has a glass transition temperature above 100° C. as calculated using the Fox equation and wherein the dispersing aid comprises polyvinyl alcohol at a concentration of at least 5 wt % based on total epoxy RDP weight. In an especially desirable embodiment of this epoxy RDP the alkali soluble polymer shell is a copolymer of methacrylate and methyl methacrylate.

The epoxy RDP of the present invention is particularly useful for formulating with cementitious components to form epoxy modified cement. The dry epoxy RDP can be dry blended with cement components to ensure easy blending prior to adding water, which tends to result in an increase in viscosity and a concomitant increase in difficulty for blending and mixing. Upon adding water the epoxy particles in the epoxy RDP redisperse around the cement components and the alkaline environment of the solution causes the alkali soluble polymer shell around the particles to release the epoxy to serve as a binder throughout the cement formulation.

A particularly desirable use for the epoxy RDP of the present invention is as a one-component dry mix system comprising the epoxy RDP, cement and sand for use in mortar preparation. Preparing mortar from the one-component dry mix system simply requires adding water to the one-component dry mix system. The mortar can then be applied to a substrate. No additional or separate hardener is required in either the dry mix system or mortar. The high alkali content of the hydrated cement promotes crosslinking of the epoxy groups in the epoxy RDP, which in turn provides flexural strength to the resulting mortar that is comparable to known three-part systems that require a separate hardener additive.

Method for Preparing the Redispersible Epoxy Polymer Powder

The method of the present invention prepares the epoxy RDP of the present invention. A characteristic feature of the process of the present invention is the direct formation of a dispersion of epoxy resin in an aqueous phase, which is in contrast to other methods that require dispersing epoxy resin into latex particles during or after emulsion polymerization in order to obtain sufficiently small epoxy resin particles to form an epoxy RDP. As a result, the epoxy RDP particle of the present method and epoxy RDP contain higher concentrations of epoxy resin than those of the prior art emulsion polymerization methods.

The process of the present invention requires dispersing epoxy resin into an aqueous phase to form an initial aqueous dispersion of epoxy resin particles ("initial epoxy resin dispersion"). Unlike other epoxy dispersions in the art that are precursors to forming epoxy resin RDPs, the dispersed epoxy resin particles are dispersed directly into an aqueous phase to form dispersed epoxy resin particles. The dispersed epoxy resin particles can be free of emulsion polymerized polymers during the step of forming the epoxy resin dispersion. In fact, the epoxy resin particles in the initial epoxy resin dispersion are more than 50 wt %, preferably 65 wt % or more, still more preferably 75 wt % or more and can be 85 wt % or more, 90 wt % or more, and even 95 wt % or more epoxy resin based on total weight of the epoxy resin particles. The aqueous phase can be simply water.

Epoxy resins suitable for use in the method of the present invention are the same as those described previously herein as suitable for the epoxy RDP of the present invention.

It is not critical to the broadest scope of the present invention how to disperse the epoxy resin into the aqueous phase to form the initial epoxy resin dispersion. It is suitable to mill or grind (for example, cryogenically grind) epoxy resin into a fine powder and disperse that fine powder into an aqueous phase. However, it is desirable to avoid having to mill or grind the epoxy resin prior to dispersing and directly break the epoxy resin up into small particles while dispersing it into an aqueous phase (that is, directly disperse epoxy resin into an aqueous phase). Directly dispersing epoxy resin into an aqueous phase is generally accomplished by providing the epoxy resin in a softened state and combining it with an aqueous phase under shear. The shear serves to break the epoxy resin into particles as it disperses those particle into the aqueous phase. Providing the epoxy resin in a softened state facilitates breaking of the resin into particles under shear. An epoxy resin is in a "softened state" if its molecules are capable of flowing with respect to one another. The softer, more flowable the epoxy resin is the easier it is to break up while dispersing.

One way to provide an epoxy resin in a softened state is to provide it at a temperature higher than its Tg. Hence, it is desirably to provide the epoxy resin at a temperature higher than its Tg when dispersing it into the aqueous phase during the method of the present invention. Moreover, it can be desirable to provide and even maintain the aqueous phase at a temperature above the Tg of the epoxy resin when dispersing the epoxy resin into the aqueous phase to maintain the epoxy in a softened state throughout the dispersing step. Since it is easier to disperse epoxy resins in a softened state, liquid epoxy resins are desirable for forming the epoxy resin dispersion, particularly resins that are liquid at ambient temperature in order to avoid cost and complexity of applying heat to soften the epoxy resin. As such, epoxy resins having a Tg of 50° C. or lower, especially those with a Tg of 25° C. or lower, 20° C. or lower and even 0° C. or lower are particularly desirable for forming the epoxy resin dispersion in the first step of the present method because they are typically inherently in a softened state without requiring further heating or softening of any other kind.

Another way to provide a epoxy resin in a softened state is to add a plasticizer to the epoxy resin. A plasticizer is any molecule that increases fluidity of a polymer by solvating the polymer molecules. Hence, the epoxy resin can be accompanied by a plasticizer as it is dispersed into an aqueous phase during the method of the present invention. Desirably, the plasticizer is a "fugitive plasticizer", which means that it ceases its plasticizing effect before or during, preferably before isolating the epoxy particles as an epoxy RDP. A plasticizer can be a fugitive plasticizer by escaping from the epoxy resin (for example, by evaporation). Another particularly desirable fugitive plasticizer is a monomeric plasticizer that serves as a comonomer during polymerization of the alkali soluble shell and that becomes less effective as a plasticizer upon polymerization. The epoxy resin can contain fugitive plasticizer, non-fugitive plasticizer, a combination of fugitive and non-fugitive plasticizer or be free of plasticizer altogether as the epoxy resin is dispersed to form an initial epoxy dispersion.

The concentration of plasticizer added to an epoxy resin prior to forming an initial epoxy dispersion is desirably 50 wt % or less, preferably 40 wt % or less, more preferably 20 wt % or less, yet more preferably 10 wt % or less, still more preferably 5 wt % or less and even more preferably 2 wt % or less or even one wt % or less. The epoxy resin can be free of plasticizers altogether. Fugitive plasticizers can generally be present at a higher concentration than non-fugitive plasticizers. Non-fugitive plasticizers have a potential of softening the epoxy resin and/or alkali soluble polymer shell to an undesirable extent such that epoxy particles irreversibly agglomerate when isolated from a dispersion. Hence, non-fugitive plasticizers are desirably present at a concentration of 5 wt % or less, preferably 2 wt % or less, even more preferably one wt % or less. Most desirably, the epoxy resin is free of non-fugitive plasticizers prior to forming an initial dispersion.

Disperse the epoxy resin into the aqueous phase using a batch, semi-continuous or continuous process. Batch processes include preparing the epoxy resin dispersion in a single container by adding the aqueous phase and epoxy resin together while mixing. It is common to add the epoxy resin to the aqueous phase while mixing, however both the aqueous phase and epoxy resin can be added together to the vessel while mixing or the epoxy resin can be added first and the aqueous phase added while mixing. It is also possible to add the epoxy resin and aqueous phase together without mixing and, once the two components have been combined, then mix them together to form a dispersion. It is desirable to form the epoxy resin dispersion by a continuous method where both aqueous phase and epoxy resin are mixed together in a continuous stream to produce an epoxy resin dispersion.

One desirable method for continuously produce the initial epoxy resin dispersion is by mechanical dispersion, such as is taught in U.S. Pat. No. 4,123,403. In a mechanical dispersion process an aqueous phase and an organic phase are fed together through a high shear mixer that disperses one phase into the other, typically forming a high internal phase emulsion or high internal phase dispersion. High internal phase emulsions and dispersions have greater than 74 volume-percent internal phase dispersed within a continuous phase where volume percent is relative to the total emulsion or dispersion volume. In the context of the method of the present invention an epoxy resin (typically either as a ground powder or as a resin in a softened state) an aqueous phase can be fed into a high shear mixer to produce a dispersion of epoxy resin in the aqueous phase. A high internal phase dispersion of epoxy resin in aqueous phase is commonly produced, which can be diluted down with additional aqueous phase if desired to, for example, reduce viscosity of the dispersion. A particularly desirable benefit of mechanical dispersion is that it can produce dispersions with dispersed particles having a highly uniform particle size (narrow particle size distribution). Moreover, the highly uniform particle size can be two micrometer or less, one micrometer or less. It is desirably to use a mechanical dispersing process with a softened epoxy resin (for example, by processing above the Tg of the epoxy resin, addition of a plasticizer like a monomeric plasticizer, or a combination of processing above the Tg of the epoxy resin and addition of a plasticizer) to prepare the initial epoxy resin dispersion.

Small epoxy particle sizes are desirable in the initial epoxy resin dispersion. The method ultimately produces the epoxy RDP of the present invention. Therefore it is desirable for the resulting epoxy RDP to redisperse into aqueous phase to produce an epoxy dispersion having an epoxy particle size as described for the epoxy RDP of the present invention (five micrometers or less, preferably two micrometers or less, still more preferably one micrometer or less, even more preferably less than one micrometer, and yet more preferably 750 nanometers or less and can be 500 nanometers or less). Therefore, the epoxy resin particles in the initial epoxy resin dispersion should be no larger than the particle size of epoxy resin particles in the dispersion formed by redispersion the epoxy RDP made by the process into an aqueous phase. As such, the epoxy particles in the initial epoxy resin dispersion desirably have a particle size of five micrometers or less, preferably two micrometers or less, still more preferably one micrometer or less, even more preferably less than one micrometer, and yet more preferably 750 nanometers or less and can be 500 nanometers or less. Create the initial epoxy resin by applying sufficient shear to break the epoxy into particle sizes sufficiently small to create the desired particle size. Generally, smaller particles require higher shear to form.

It is often required to use a dispersing aid to prepare the initial epoxy resin dispersion. A dispersing aid can serve to stabilize epoxy resin particles in the aqueous phase. A dispersing aid can be added to the epoxy resin prior to dispersing, to the aqueous phase prior to dispersing the epoxy resin, or added to the initial epoxy dispersion as the epoxy resin and aqueous phase are being mixed. Suitable dispersing aids for stabilizing the initial epoxy resin dispersion include those dispersing aids taught above with regard to the epoxy RDP. Desirably, any dispersing aid added before or during the formation of the initial epoxy resin dispersion comprises or consists of PVOH. If added prior or during formation of the initial epoxy resin dispersion, the dispersing aid is typically present at a concentration of 15 wt % or less, preferably ten wt % or less and can be present at a concentration of six wt % or less, even five wt % or less, four wt % or less relative to total epoxy resin weight. One desirable embodiment uses 7.5 wt % PVOH to form an initial dispersion of epoxy resin, with wt % relative total epoxy resin weight.

An alkali soluble polymer shell as described previously with regards to the epoxy RDP is polymerized around the epoxy resin particles by polymerizing monomers in the initial epoxy dispersion. Therefore, the method requires introducing so as to be present in the initial epoxy dispersion during polymerization of the alkali soluble polymer shell a selection of unsaturated monomers. Addition of the unsaturated monomers can occur at any point or combination of points prior to or concurrent with polymerization of the monomers to form the alkali soluble polymer shell.

All of the unsaturated monomers, or a portion of the unsaturated monomers, can be mixed with the epoxy resin prior to forming the initial epoxy dispersion. It is desirable that unsaturated monomers added to the epoxy resin prior to forming the initial epoxy dispersion be miscible with the epoxy resin and even plasticize the epoxy resin to facilitate forming the initial epoxy dispersion. When unsaturated monomers are present in the epoxy resin particles of the initial epoxy dispersion the polymerization of the unsaturated monomers to form an alkali soluble polymer shell is a type of miniemulsion polymerization where monomer that is undergoing polymerization is present in a dispersed particle that has a particle size of one micron or less. One characteristic feature of this miniemulsion polymerization is that that majority of the material in the particles is epoxy resin rather than monomers undergoing emulsion polymerization. Blending a plasticizing unsaturated monomer with the epoxy provides at least two benefits. First, it softens the epoxy resin to facilitate direct dispersion of the epoxy resin into the aqueous phase. Second, it provides a means of distributing alkali-soluble shell forming monomer to a highly uniform extent throughout the resulting epoxy resin dispersion, which is believed to result in a more uniform alkali-soluble shell formation around the epoxy resin particles later in the method. The plasticizing unsaturated monomer is desirably selected from a group consisting of acrylate and methacrylate monomers that plasticize the epoxy resin. A particularly desirable plasticizing monomer is methyl methacrylate.

All of the unsaturated monomers, or a portion of the unsaturated monomers, can be mixed into the initial epoxy dispersion after forming the initial epoxy dispersion. In that regard, the unsaturated monomers can be mixed into the initial epoxy dispersion before or during the polymerization of unsaturated monomers to form the alkali soluble shell around the epoxy particles. Therefore, unsaturated monomers for polymerizing to form the alkali soluble polymer shell can be added before forming the initial epoxy dispersion, after forming the initial epoxy dispersion but prior to initiating polymerization, after forming the initial epoxy dispersion and while polymerizing, or any combination of these addition options.

The total amount of unsaturated monomer polymerized into the alkali soluble polymer shell, including any monomer combined with the epoxy resin in forming the initial epoxy resin dispersion and monomer fed into the initial epoxy resin dispersion, comprises at least five wt %, preferably ten wt % or more, still more preferably 15 wt % or more and yet more preferably 20 wt % or more of monomers selected from carboxylic acid monomers and anhydride monomers based on total weight of monomers polymerized to form the alkali soluble polymer shell. At the same time, the alkali soluble polymer shell has 40 wt % or less, preferably 30 wt % or less of copolymerized monomer selected from carboxylic acid and anhydride monomers based on total weight of monomers polymerized to form the alkali soluble polymer shell. The remaining monomers copolymerized to form the alkali soluble polymer shell are desirably selected from a group consisting of methyl acrylate, ethyl acrylate, butyl acrylate, 2-ethylhexyl acrylate, decyl acrylate, methyl methacrylate, ethyl methacrylate, butyl methacrylate, acrylic acid, methacrylic acid, itaconic acid, maleic acid, fumaric acid, styrene, substituted styrene, acrylonitrile, vinyl acetate, other alkyl acrylates having from one to twelve carbon alkyl groups. The monomers are selected to form an alkali soluble polymer shell having a Tg of at least 60° C., preferably at least 75° C., still more preferably at least 90° C., even more preferably at least 100° C. as calculated using the Fox equation. One desirable combination of unsaturated monomers consists of five to 40 wt % of monomers selected from carboxylic acids and anhydrides, 30 to 95 wt % of monomers selected from alkyl acrylate, alkyl methacrylate and styrene, and zero to 30 wt % of a hydroxyalkyl ester of a carboxylic acid or acrylamide or methacrylamide with wt % based on total monomers copolymerized to form the alkali soluble polymer shell copolymer.

The unsaturated monomers used to form the alkali soluble polymer shell (including any unsaturated monomer added before or during formation of the initial epoxy resin dispersion as well as added to the initial epoxy resin dispersion) desirably comprise, even consist of methacrylic acid and methyl methacrylate. The concentration of methacrylic acid is desirably five wt % or more, preferably ten wt % or more, still more preferably fifteen wt % or more and even more preferably twenty wt % or more while at the same time being desirably sixty wt % or less, preferably fifty wt % or less and typically 40 wt % or less based on total weight of the unsaturated monomers. The balance of the unsaturated monomers is desirably methyl methacrylate. A portion of or all of the methyl methacrylate is desirably included with the epoxy resin prior or during formation of the initial epoxy resin dispersion, preferably prior to formation of initial epoxy dispersion. Typically, the unsaturated monomers that are added to the initial epoxy dispersion are added gradually over the course of the polymerization of the alkali soluble polymer shell.

The method desirably includes adding methyl methacrylate as an unsaturated monomer to the epoxy resin prior to or during formation of the initial epoxy dispersion. At the same time, the method desirably includes adding methacrylic acid as an unsaturated monomer, preferably after formation of the initial epoxy dispersion and during or prior to addition of a free radical initiator and polymerization of the alkali polymer shell. The unsaturated monomers can consist of just these two monomers added in this manner. For example, methyl methacrylate can be added prior to forming the initial epoxy dispersion while methyl methacrylate can be added during polymerization of the alkali soluble polymer shell.

A free radical initiator is fed into the initial epoxy resin dispersion before, during or after addition of the unsaturated monomers and the mixture is subjected to conditions that result in free radical polymerization while stirring so as to polymerize the unsaturated monomers in to an alkali soluble polymer shell around each epoxy resin particle. The free radical initiator serves to trigger polymerization of the unsaturated monomers around the dispersed epoxy resin particles of the initial epoxy resin dispersion. Suitable free radical initiators include thermal and/or redox triggered initiators, preferably that are water soluble. Examples of suitable thermally triggered initiators include persulfate salts (for example, sodium persulfate and ammonium persulfate). Suitable redox initiators include combinations of an oxidizing agent (such as persulfate salt and organic peroxides) and reducing agents (such as sodium formaldehyde sulfoxylate) and a redox catalyst such a iron (II) sulfate. "Conditions that result in free radical polymerization" depend on the type of free radical initiator added. For example, thermally triggered initiators will decompose and trigger free radical polymerization in the presence of unsaturated monomers at a temperature above their free radical decomposition temperature (initiation temperature). Thermally triggered initiators may require applying heat to the mixture of initial epoxy dispersion, unsaturated monomers and initiators achieve conditions that result in free radical polymerization depending on the initiation temperature of the initiator and the ambient temperature of the mixture. Redox initiators require the presence of an appropriate reducing and oxidization agent pair that when mixed together reacts to form polymerization initiating free radicals.

The amount of free radical initiator is generally 0.01 wt % or more, preferably 0.1 wt % or more while at the same time is generally two wt % or less, with wt % relative to unsaturated monomer weight.

The resulting epoxy resin dispersion comprising epoxy particles having an alkali soluble shell is a dispersion of the present invention.

Isolate the resulting epoxy resin particles that have an alkali soluble polymer shell as an epoxy RDP by removing the continuous aqueous phase. Removal of the aqueous phase can be done any number of ways including freeze drying or spray drying (atomization), or a combination of both. It is preferably to isolate the epoxy RDP by spray drying the dispersion containing the epoxy particles with the alkali soluble shell. In order to help prevent irreversible agglomeration of the epoxy resin particles it is common to introduce an anti-caking agent to the epoxy resin particles during the spray drying step. Anti-caking agent can be added in any manner including mixing in with the dispersion prior to spray drying or mixing with the dispersion while spray drying by, for example, blowing into to a chamber with the dispersion. Suitable anti-caking agents include mineral filler such as calcium carbonate, kaolin, barium sulphate, titanium oxide, talc, hydrated alumina, bentonite, calcium sulphoaluminate and silica. Generally the concentration of anti-caking agent added to the epoxy resin particles is 0.5 wt % or more, preferably 2 wt % or more, even more preferably 5 wt % or more and at the same time is generally 50 wt % or less, preferably 20 wt % or less and more preferably 15 wt % or less with wt % relative to dispersion solids weight.

A dispersing aid can also be added while feeding and polymerizing the alkali polymer shell monomers, while spray drying the epoxy resin particles, or both. Desirably, add a dispersing aid when spray drying the epoxy resin particles. The dispersing aid added when spray drying should facilitate redispersion of the epoxy resin particles when the epoxy RDP particles are added to an aqueous solution. Suitable dispersing aids that can be added during the spray drying include those already identified for the epoxy RDP. It is particularly desirable to add PVOH to the epoxy resin particles during the spray drying process. The desired concentration of PVOH added during the spray drying process is desirably 10-15 wt % relative to total weight of epoxy resin weight.

The total amount of dispersing aid added during the entire process of the present invention is as described for the epoxy RDP of the present invention. In particular, the total amount of dispersing aid is two wt % or more, preferably 5 wt % or more, still more preferably 10 wt % or more and is generally present at a concentration of 25 wt % or less, preferably 20 wt % or less, and more preferably 15 wt % or less with wt % relative to total combined weight of epoxy resin, alkali soluble polymer shell and dispersing aid. The process of the present invention desirably includes adding a total amount of PVOH as a, or even as the only, dispersing aid at a concentration of 5 wt % or more, preferably 10 wt % or more and desirably 20 wt % or less, preferably 15 wt % or less relative to total epoxy RDP particle weight.

The resulting epoxy RDP isolated during the spray drying process is an epoxy RDP of the present invention.

The process of the present invention is desirably characterized by the epoxy resin having a glass transition temperature in a range of −40° C. to 50° C. (inclusive or exclusive of 50° C.), the monomers used to form the alkali soluble polymer shell being selected from a group consisting of acrylates, ethyl acrylates, butyl acrylates, 2-ethylhexyl acrylate, decyl acrylates, methyl methacrylate, ethyl methacrylate, butyl methacrylate, acrylic acid, methacrylic acid, itaconic acid, maleic acid, and fumaric acid so that the resulting alkali soluble polymer shell has a glass transition temperature above 100° C. as calculated using the Fox equation, and the dispersing aid comprises polyvinyl alcohol at a concentration of at least five wt % based on total weight of epoxy resin, alkali soluble polymer shell and dispersing aid. In a particularly desirable embodiment of this process the monomers used to form the alkali soluble shell are a combination of methacrylic acid and methyl methacrylate.

The present invention further is a dispersion of epoxy particles comprising epoxy resin particle dispersed in an aqueous solution, where the epoxy resin particles comprise epoxy resin and an alkali soluble polymer shell around individual epoxy resin particles. The epoxy resin and alkali soluble polymer shell are as described for the epoxy RDP of the present invention. Dispersion of epoxy particles that fall within the scope of the present invention include the dispersion of epoxy particles comprising an alkali soluble shell prior to removing the aqueous phase that is formed during the method of the present invention. Dispersions formed by redispersing the epoxy RDP of the present invention into an aqueous phase also qualify as dispersions of the present invention.

The following examples further describe embodiments of the present invention.

EXAMPLE 1

Preparation of Initial Epoxy Dispersion

Into a 300 milliliter PARR reactor equipped with a Cowles blade add 50.0 grams of an epoxy resin having an epoxide equivalent weight of 500-560 by ASTM D-1652, an epoxide percentage of 7.7-8.6 by ASTM D-1652, an epoxide content of 1780-2000 millimole per kilogram by ASTM D-1652, a Tg of 41° C. (for example, Dow Epoxy Resin (DER) 661) and 18.5 grams of a 27 wt % aqueous solution of a PVOH having weight-average molecular weight of approximately 31,000 grams per mole (for example, Mowiol™ 4-88 polyvinyl alcohol, Mowiol is a trademark of Hoechst Aktiengesellschaft). Seal the reactor and heat to 100° C. then stir for 10 minutes at 1830 revolutions per minute. Using a high pressure liquid chromatography (HPLC) pump add 30 milliliters (mL) of water to the solution in the reactor at a rate of one milliliter per minute (mL/min) Cease heating and increase the water addition rate to 10 mL/min for five minutes to add 50 more mL of water while the reactor and solution cool. Cease stirring when the solution reaches 50° C. and isolate the resulting initial epoxy dispersion through a 190 micrometer filter. The resulting initial epoxy dispersion is 91 wt % epoxy resin based on total weight of epoxy resin and dispersing aid and has a particle size of 298 nanometers and is 33 wt % solids based on total dispersion weight.

Polymerizing Alkali Soluble Polymer Shell and Spray Drying

Into a round bottom flask add 100 grams of the initial epoxy dispersion and purge with nitrogen gas while maintaining at 60° C. While stirring, add 2.5 milligrams of ferrous sulfate as a one wt % aqueous solution. Premix 6.60 grams of methyl methacrylate and 1.65 grams of methacrylic acid and inject the mixture into the reactor over 30 minutes. At the same time feed a five wt % aqueous solution of tert-butyl peroxide and a five wt % aqueous solution of sodium hydroxymethanesulfinate so as to add a total of one wt % of each component relative to monomer weight into the reactor as a free radical initiator over 45 minutes. Maintain the reaction at 60° C. for 60-90 minutes and then allow to cool to 25° C. and filter through a 190 micrometer filter. The resulting dispersion comprises epoxy resin particles containing 77 wt % epoxy resin, 8 wt % dispersing aid (PVOH) and 15 wt % alkali soluble shell comprising a copolymer of methacrylic acid and methyl methacrylate, with wt % relative to total combination of epoxy resin, dispersing aid and alkali soluble polymer shell. The resulting dispersion has a particle size of 307 nanometers.

Pump the resulting dispersion to a two-fluid nozzle atomizer equipped on a Mobile Minor spray dryer. Fix the air pressure to the nozzle at 100 kilopascals with 50% flow, which is equivalent to 6 kilograms per hour of air flow. Spray dry the epoxy dispersion in a nitrogen gas environment with an inlet temperature fixed at 120-140° C. and outlet temperature set at 50° C. Add kaolin clay powder (for example, Kamin™ HG-90, Kamin is a trademark of Kamin LLC) as an anti-caking agent at a concentration of eight wt % relative to solids weight in the dispersion. Dry the resulting epoxy RDP at 40° C.

Redispersing the resulting RDP in water at a pH of 9-11 by adding 0.1 grams of RDP to ten milliliters of water and add 1-2 drops of one molar sodium hydroxide solution and vortex for one minute. The epoxy particles redisperse to form a dispersion having a particle size of 310 nm.

Tg analysis of the epoxy RDP reveals an epoxy Tg within 5° C. of the neat epoxy resin which confirms a core-shell structure with an essentially unmodified epoxy resin. Moreover, isolation of the epoxy resin particle via the spray drying process without irreversibly agglomerating the particles together confirms that a shell exists around the epoxy resin particles that precludes intermingling of epoxy resin between particles when the particle contact. The epoxy particles readily redisperse in alkaline aqueous solution, even more readily than in acidic aqueous solutions, which is consistent with the shell solublizing in the alkaline aqueous solution and is indicative of an alkali soluble shell around the epoxy resin core.

Example 1 illustrates a method of the present invention that produces and epoxy RDP of the present invention. The process directly disperses epoxy resin into an aqueous phase using a non-ionic dispersing aid. Dispersing aid is only introduced during formation of the initial epoxy resin dispersion. The epoxy RDP has an epoxy resin concentration of 77 wt %, alkali soluble polymer shell concentration of 15 wt % and dispersing aid concentration of 8 wt % relative to total combined weight of epoxy resin, alkali soluble polymer shell and dispersing aid.

EXAMPLE 2

Preparation of Initial Epoxy Dispersion

Into a 300 milliliter PARR reactor equipped with a Cowles blade add 50.0 grams of a blend of epoxy resins: 25.0 grams of an epoxy resin as in Example 1 and 25.0 grams of a liquid epoxy resin having an epoxide equivalent weight of 82-192 by ASTM D-1652, an epoxide percentage of 22.4-23.6 by ASTM D-1652, an epoxide content of 5200-5500 millimole per kilogram by ASTM D-1652, a glass transition temperature of −19° C. (for example, Dow Epoxy Resin (DER) 331). The resulting blend of epoxy resins has a Tg of 7° C. Add to the reactor 3.5 grams of anionic dispersing aid (E-SPERSE™ 100, 60 wt % solids in aqueous solution; E-Sperse is a trademark of Ethox Chemicals, LLC). Seal the reactor and heat to 100° C. then stir for 10 minutes at 1830 revolutions per minute. Using a high pressure liquid chromatography (HPLC) pump add 20 milliliters (mL) of water to the solution in the reactor at a rate of one milliliter per minute (mL/min) Cease heating and increase the water addition rate to 10 mL/min for six minutes to add 60 more mL of water while the reactor and solution cool. Cease stirring when the solution reaches 50° C. and isolate the resulting initial epoxy dispersion through a 190 micrometer filter. The resulting initial epoxy dispersion is 96 wt % epoxy resin based on total epoxy resin and dispersing aid weight and has a particle size of 330 nanometers. The dispersion is 36 wt % solids based on total dispersion weight.

Polymerizing Alkali Soluble Polymer Shell and Spray Drying

Into a round bottom flask add 50 grams of the initial epoxy dispersion and purge with nitrogen gas while maintaining at 50° C. While mixing, add 2.5 milligrams of ferrous sulfate as an aqueous solution. Premix 3.27 grams of methyl methacrylate and 0.82 grams of methacrylic acid and inject the mixture into the reactor over 30 minutes. At the same time feed an aqueous solution of tert-butyl peroxide and sodium hydroxymethanesulfinate into the reactor as a free radical initiator over 45 minutes as described for Example 1. Maintain the reaction at 50° C. for 120 minutes and then allow to cool to 25° C. and filter through a 190 micrometer filter. The resulting dispersion comprises epoxy resin particles containing 78 wt % epoxy resin, 3 wt % dispersing aid and 19 wt % alkali soluble shell comprising a copolymer of methacrylic acid and methyl methacrylate, with wt % relative to total combination of epoxy resin, dispersing aid and alkali soluble polymer shell. The resulting dispersion has a particle size of 335 nanometers.

Prior to spray drying add solid PVOH dispersing aid (10 wt % relative to epoxy weight). The PVOH is the same as described for Example 1. Pump the resulting dispersion to a two-fluid nozzle atomizer equipped on a Mobile Minor spray dryer. Fix the air pressure to the nozzle at 100 kilopascals with 50% flow, which is equivalent to 6 kilograms per hour of air flow. Spray dry the epoxy dispersion in a nitrogen gas environment with an inlet temperature fixed at 120-140° C. and outlet temperature set at 40° C. Add kaolin clay powder (for example, Kamin™ HG-90, Kamin is a trademark of Kamin LLC) as an anti-caking agent at a concentration of eight wt % relative to solids weight in the dispersion. Dry the resulting epoxy RDP at 40° C.

Redisperse the resulting RDP in water at pH 11 in like manner as described in Example 1. The epoxy particles redisperse to form a dispersion having a particle size of 330 nanometers Tg analysis of the epoxy RDP reveals an epoxy Tg within 5° C. of the neat epoxy resin which confirms a core-shell structure with an essentially unmodified epoxy resin. Moreover, isolation of the epoxy resin particle via the spray drying process without irreversibly agglomerating the particles together confirms that a shell exists around the epoxy resin particles that precludes intermingling of epoxy resin between particles when the particle contact. The epoxy particles readily redisperse in alkaline aqueous solution, even more readily than in acidic aqueous solutions, which is consistent with the shell solublizing in the alkaline aqueous solution and is indicative of an alkali soluble shell around the epoxy resin core.

Example 2 illustrates a method of the present invention that produces an epoxy RDP of the present invention using an epoxy resin composition having an average Tg of seven ° C. The process directly disperses epoxy resin into an aqueous phase using an anionic dispersing aid. Dispersing aids are added both during formation of the epoxy resin initial dispersion and upon spray drying to isolate the final epoxy RDP. The epoxy RDP has an epoxy resin concentration of 72 wt %, alkali soluble polymer shell concentration of 18 wt % and dispersing aid concentration of 10 wt % (PVOH+E-Sperse 100) relative to total combined weight of epoxy resin, alkali soluble polymer shell and dispersing aid.

EXAMPLE 3

Preparation of Initial Epoxy Dispersion

Dissolve 150 grams of epoxy resin as used in Example 1 into 40 grams of methyl methacrylate. Add 100 grams of the resulting solution into a polyethylene beaker and add 18 grams of aqueous PVOH solution (28 wt % solids, PVOH is as used in Example 1) and 0.5 grams of Hitenol BC-10 polymerizable anionic surfactant (100% active; Hitenol BC available from Montellow, Inc.). Mix with a serrated blade at 3000 revolutions per minute for approximately two minutes. While continuing mixing, add 15-20 mL of water at a rate of 3 mL/minute to achieve a thick paste/gel. Continue mixing for an additional three minutes. Continue addition water at a rate of 20 mL/minute until a total of 175 mL of water has been added. The result is an initial dispersion that is an oil in water dispersion where the oil phase is a combination of epoxy resin and methyl methacrylate monomer. Prepare the initial dispersion at approximately 25° C. The initial dispersion has a particle size of 406 nanometers.

Polymerizing Alkali Soluble Polymer Shell and Spray Drying

Transfer the initial dispersion into a polymerization flask equipped with a nitrogen purge, reflux condenser, thermometer and stirrer. While stirring, add 5 grams of methacrylic acid to the initial dispersion. Then while continuing to stir, add 0.6 mL of 1 wt % of aqueous ferrous sulfate solution and heat the resulting mixture to 60°. Add 10 mL of 2.6 wt % aqueous sodium formaldehyde sulfoxylate solution and 10 mL of aqueous tert-butyl hydroperoxide solution (0.5 grams of 70 wt % in 10 mL of water) over a one-hour period of time. Continue mixing at 60° C. for 45 minutes after all of the one-hour addition is complete to form a dispersion of epoxy resin having an alkali soluble shell. The resulting dispersion has a particle size of 406 nanometers.

Pump the dispersion of epoxy resin having an alkali soluble shell through a two-fluid atomizer equipped on a Mobile Minor spray dryer. Fix the air pressure to the nozzle at 100 kilopascals with 50% flow, which is equivalent to 6 kilograms per hour of air flow. Spray dry the epoxy dispersion in a nitrogen gas environment with an inlet temperature fixed at 140° C. and outlet temperature set at 50° C. Add kaolin clay powder (for example, Kamin™ HG-90, Kamin is a trademark of Kamin LLC) as an anti-caking agent at a concentration corresponding to 10 wt % of total solids weight. Dry the resulting epoxy RDP at 40° C.

The resulting epoxy RDP has an average powder particle size of 10-20 micrometers due to reversible agglomeration of particles. Upon dispersing the epoxy RDP powder into water at a pH of 11 at a one-wt % solution and vortexing two times at 30 seconds the epoxy RDP redisperses so as to have a dispersed epoxy particle size of 410 nanometers.

Tg analysis of the epoxy RDP reveals an epoxy TG within 5° C. of the neat epoxy resin which confirms a core-shell structure with an essentially unmodified epoxy resin. Moreover, isolation of the epoxy resin particle via the spray drying process without irreversibly agglomerating the particles together confirms that a shell exists around the epoxy resin particles that precludes intermingling of epoxy resin between particles when the particle contact. The epoxy particles readily redisperse in alkaline aqueous solution, even more readily than in acidic aqueous solutions, which is consistent with the shell solublizing in the alkaline aqueous solution and is indicative of an alkali soluble shell around the epoxy resin core.

Example 3 illustrates a method of the present invention that comprises blending a monomer with the epoxy resin prior to dispersing the resin directly into an aqueous phase. Dispersing aid is added only during formation of the initial dispersion of epoxy resin. Example 3 further illustrates an epoxy RDP of the present invention having a composition of 76 wt % epoxy resin, 19 wt % alkali soluble polymer shell and 5 wt % dispersing aid, and a particle size of 410 nanometers when redispersed in water.

EXAMPLE 4

Preparation of Initial Epoxy Dispersion

Blend 75 grams of a liquid epoxy resin having an epoxide equivalent weight of 82-192 by ASTM D-1652, an epoxide percentage of 22.4-23.6 by ASTM D-1652, an epoxide content of 5200-5500 millimole per kilogram by ASTM D-1652, a glass transition temperature of −18° C. ° C. by ASTM D-3104 (for example, DER 331 epoxy resin) with 18 grams of methyl methacrylate in a polyethylene beaker. Ad 35 grams of 28 wt % aqueous PVOH solution (PVOH is as used in Example 1) and 0.5 grams of Hitenol BC-10 polymerizable anionic surfactant (100% active; Hitenol BC available from Montellow, Inc.). Mix with a serrated blade at 3000 revolutions per minute for approximately two minutes. While continuing mixing, add 15-20 mL of water at a rate of 3 mL/minute to achieve a thick paste/gel. Continue mixing for an additional three minutes. Continue addition water at a rate of 20 mL/minute until a total of 175 mL of water has been added. The result is an initial dispersion that is an oil in water dispersion where the oil phase is a combination of epoxy resin and methyl methacrylate monomer. Prepare the dispersion at approximately 25° C. The resulting dispersion has a particle size of 720 nanometers.

Polymerizing Alkali Soluble Polymer Shell and Spray Drying

Transfer the initial dispersion into a polymerization flask equipped with a nitrogen purge, reflux condenser, thermometer and stirrer. While stirring, add 7 grams of methacrylic acid to the initial dispersion. Add one mL of 1 wt % of aqueous ferrous sulfate solution and heat the resulting mixture to 70° C. Add 10 mL of 5 wt % aqueous sodium formaldehyde sulfoxylate solution and 10 mL of a solution of 0.5 grams of 70 wt % aqueous tert-butyl hydro peroxide in 10 mL of water over a one-hour period of time. Continue mixing at 60° C. for 45 minutes after all of the one-hour addition is complete to form a dispersion of epoxy resin having an alkali soluble shell. The resulting dispersion has a particle size of 720 nanometers. The dispersed particle composition is 68 wt % epoxy resin, 23 wt % alkali soluble shell and 9 wt % dispersing aid based on total epoxy RDP particle weight.

Mix the resulting dispersion of epoxy resin having an alkali soluble shell with a 10 solid PVOH (same PVOH used in Example 2) and pump the resulting mixture through a two-fluid atomizer equipped on a Mobile Minor spray dryer. Fix the air pressure to the nozzle at 100 kilopascals with 50% flow, which is equivalent to 6 kilograms per hour of air flow. Spray dry the epoxy dispersion in a nitrogen gas environment with an inlet temperature fixed at 140° C. and outlet temperature set at 40° C. Add kaolin clay powder (for example, Kamin™ HG-90, Kamin is a trademark of Kamin LLC) as an anti-caking agent at a concentration corresponding to 10 wt % of total solids weight. Dry the resulting epoxy RDP at 40° C.

The resulting epoxy RDP has an average powder particle size of 10-20 micrometers due to reversible agglomeration of particles. Upon dispersing the epoxy RDP powder into water at pH of 9-11 at a one-wt % solution and vortexing two times at 30 seconds the epoxy RDP redisperses so as to have a dispersed epoxy particle size of 1600 nm or less.

Tg analysis of the epoxy RDP reveals an epoxy Tg within 5° C. of the neat epoxy resin which confirms a core-shell structure with an essentially unmodified epoxy resin. Moreover, isolation of the epoxy resin particle via the spray drying process without irreversibly agglomerating the particles together confirms that a shell exists around the epoxy resin particles that precludes intermingling of epoxy resin between particles when the particle contact. The epoxy particles readily redisperse in alkaline aqueous solution, even more readily than in acidic aqueous solutions, which is consistent with the shell solublizing in the alkaline aqueous solution and is indicative of an alkali soluble shell around the epoxy resin core.

Example 4 illustrates a method of the present invention that comprises blending a monomer with the epoxy resin prior to dispersing the resin directly into an aqueous phase. Dispersing aids are added both during formation of the epoxy resin initial dispersion and upon spray drying to isolate the final epoxy RDP. Example 4 further illustrates an epoxy RDP of the present invention having a composition of 66 wt % epoxy resin, 17 wt % alkali soluble shell and 17 wt % dispersing aid, and an average particle size of 1600 nanometers or less when redispersed in water having pH of 9-11 as per Example 1. Yet more, Example 4 illustrates a process for preparing an epoxy RDP and a epoxy RDP that comprises greater than 50 wt % epoxy resin that is a liquid at 20° C., with wt % relative to total weight of epoxy resin, alkali soluble shell and dispersing aid.

EXAMPLE 5

One-Component Dry Mix and Mortar Therefrom

Example 5 is a one-component dry mix system comprising the RDP of Example 1. Comparative Examples (Comp Exs) A-C provide alternative systems. Comp Ex A is a typical three-part system with a separate hardener available under the tradename Sika Armatec 110 EpoCem™ (EPOCEM is a trademark of Sika Ag) comprising a Part A (liquid bisphenol A epoxy dispersion (epoxy weight-average molecular weight <700 g/mol), a Part B (isophorone diamines solution) and a part C (dry mix of amorphous silica and cement).

Prepare four mortars according to the descriptions in Table 1:

TABLE 1

| | Example 5 | Comp Ex A | Comp Ex B | Comp Ex C |
|---|---|---|---|---|
| Polymer | RDP from Ex 1 | Sika Part A & B | Initial Epoxy Dispersion from Ex 1 | ASR Powder[a] |
| Tg (° C.) | 39 | <0 | 39 | >100 |
| EEW (gram/equivalent) | 500-600 | <200 | 500-560 | N/A |
| Sand and cement | Sika C | Sika C | Sika C | Sika C |
| Defoamer[b] (wt % based on Sika C weight) | 0.047 | 0.047 | 0.047 | 0.047 |
| Kaolin clay[c] (wt % based on polymer wt) | None | None | 14 | 14 |

TABLE 1-continued

| | Example 5 | Comp Ex A | Comp Ex B | Comp Ex C |
|---|---|---|---|---|
| Final Water Load (wt % relative to Sand and Cement) | 15.66 | 15.66 | 15.66 | 15.66 |

[a]ASR Powder is a polymethylmethacrylate-poly(methacrylic acid) (4:1) copolymer having a particle size in dispersed state of 400 nanometers which is spray dried into powder with 40% Mowiol ™ 488 as a colloidal stabilizer to match the PVOH/ASR ratio is the Example 1 RDP.
[b]Defoamer is propylene oxide modified Kaolin clay (40 wt % clay).
[c]Kamin ™ HG-90

Prepare dry mix systems by combining the sand, cement and polymer together in a plastic bag, seal the bag and then shake well for two minutes. Prepare mortars from the dry mixes by slowly adding the dry mix to water in the mixing bowl of a Hobart mixer (model N-50 on speed 1) over two minutes. Allow the mortar to mix for 30 seconds. Remove the mixing blade and hand mix with a spatula for one minute, then reattach the mixing blade and mix for one minute with the Hobart mixer. Slake the mortar with a uniformly moist trowel and cover for ten minutes. Then mix with the Hobart mixer for an additional 15 seconds and characterize the mortar viscosity as Thin, Good, or Thick.

Characterize the flexural strength of the mortars according to ASTM C580-02 (2008). Assemble standard molds (51 mm×51 mm×254 mm) available from Humboldt Test Equipment, Schiller Park, Ill., USA). Fill the molds half-full with mortar and then force air pockets out with a rubber compound tamper (152 mm×13 mm×25 mm; available from Humboldt Test Equipment). Finish filling the molds and tamp again. Create a flat, even surface on the mortar using a metal spatula. Cover the molds with a polyester film and allow to set for 72 hours and then demold the samples and allow them to set another four days. Characterize the flexural strength using a United Floor Model Smart-1 Machines Model SFTM-150 KN (United Testing Systems, Inc.) using a one kilo Newton load cell and a span of 229 mm Apply the load to the sample to achieve a deflection rate of 3.429 mm per minute (0.135 inches/minute) until failure.

Table 2 reveals the characterization of Example 5 and Comp Exs A-C. A comparison of properties from mortars from Example 5 and Comparative Examples A-C illustrate the surprisingly desirable performance of a mortar prepared from a one-component dry mix system using an RDP of the present invention without an additional hardener.

TABLE 2

| Sample | Flexural Strength (MPa) | Standard Deviation for Flexural Strength (MPa) | Viscosity Evaluation |
|---|---|---|---|
| Example 5 | 8.16 | 2.04 | Good |
| Comp Ex A | 8.59 | 1.61 | Thin |
| Comp Ex B | 6.57 | 2.02 | Thick |
| Comp Ex C | <1.00 | N/A | Thin |

The two-component mortar of Example 5 has a similar flexural strength as the three-part mortar of Comp Ex A while having a good workability (viscosity) without rheology modifiers. To note, Example 5 and Comp Ex A demonstrated similar shrinkage during setting over the 7 days as well. In contrast, Comp Ex B showed lower workability due to a higher viscosity and a lower flexural strength. Comp Ex C did not set up or cure, indicating that flexural strength is attributed to the epoxy phase. Example 5 and Comp Exs A-C reveal the ability and value in use of an epoxy RDP of the present invention in mortar applications.

The invention claimed is:

1. An aqueous redispersible epoxy polymer powder (epoxy RDP) comprising:
   (a) epoxy resin articles;
   (b) an alkali soluble polymer shell around each epoxy resin particle, the alkali soluble polymer shell comprising a polymer made of at least five weight-percent and forty weight-percent or less of monomers selected from carboxylic acid monomers and anhydride monomers based on total weight of monomers polymerized to form the alkali soluble polymer shell and the alkali soluble polymer shell having a glass transition temperature of at least 60 degrees Celsius as calculated by the Fox equation; and
   (c) a dispersing aid;
   wherein the epoxy resin is present at a concentration of greater than fifty weight-percent and ninety weight-percent or less, the alkali soluble polymer shell is present at a concentration in a range of ten to fifty weight-percent and the dispersing aid is present at a concentration of two to twenty-five weight-percent with weight-percents of epoxy resin, alkali soluble polymer shell and dispersing aid being based on the combined total weight of epoxy resin, alkali soluble polymer shell and dispersing aid such that the combined weight percents of each of these three components is 100 weight-percent.

2. The aqueous redispersible epoxy polymer powder of claim 1, further characterized as having an average particle size of two micrometers or less as measured by laser diffraction according to ISO 13320-2009 using a Coulter Counter particle size and count analyzers when the water aqueous redispersible polymer powder is dispersed in an aqueous liquid having a pH in a range of 9-11.

3. The aqueous redispersible epoxy polymer powder of claim 1, further characterized by the epoxy resin being present at a concentration of at least 75 weight-percent based on total combined weight of epoxy resin, alkali soluble polymer shell and dispersing aid.

4. The aqueous redispersible polymer powder of claim 1, further characterized by the epoxy resin having a glass transition temperature of 20 degrees Celsius or lower as measured by ASTM D7426-08 using a heating and cooling rate of 10° C. per minute.

5. The aqueous redispersible epoxy polymer powder of claim 1, further characterized by the alkali soluble polymer shell comprising a copolymer of methyl methacrylate and methacrylic acid and having a glass transition temperature of at least 100 degrees Celsius as calculated by the Fox equation.

6. The aqueous redispersible epoxy polymer powder of claim 1, further characterized by the dispersing aid comprising polyvinyl alcohol at a concentration of at least five weight-percent based on total weight of epoxy resin, alkali soluble polymer shell and dispersing aid.

7. The aqueous redispersible epoxy polymer powder of claim 1, further characterized by the epoxy resin having a glass transition temperature in a range of −40 degrees Celsius to 50 degrees Celsius, the alkali soluble polymer shell comprising a polymer consisting of polymerized monomer selected from a group consisting of acrylate, ethylacrylate, butyl acrylate, 2-ethylhexyl acrylate, decyl acrylate, methyl methacrylate, ethyl methacrylate, butyl methacrylate, acrylic acid, methacrylic acid, itaconic acid, maleic acid, and fumaric acid and selected so that the alkali soluble polymer shell has a glass transition temperature above 100 degrees Celsius as calculated using the Fox equation and wherein the dispersing aid comprises polyvinyl alcohol at a concentration of at least five weight-percent based on total weight of epoxy resin, alkali soluble polymer shell and dispersing aid.

8. A method for preparing the aqueous dispersible epoxy polymer powder (epoxy RDP) of claim 1, the method comprising:
(a) dispersing an epoxy resin into an aqueous phase to form an initial epoxy resin dispersion of epoxy resin particles that contain more than 50 weight-percent epoxy resin by weight of the epoxy resin particles;
(b) introducing so as to be present in the initial epoxy dispersion during the polymerization step (c) a selection of unsaturated monomers at any point or combination of points prior to or concurrent with the following polymerization step (c), wherein at least five weight-percent and 40 weight-percent or less of the unsaturated monomers are selected from carboxylic acid monomers and anhydride monomers;
(c) feeding a free radical initiator into the initial epoxy resin dispersion and subjecting the dispersion, free radical initiator and monomers to conditions that result in free radical polymerization while stirring so as to polymerize the unsaturated monomers into an alkali soluble polymer shell around each epoxy resin particle; and
(d) removing the aqueous phase from the epoxy resin particles having an alkali soluble polymer shell to obtain an aqueous redispersible epoxy polymer powder;
wherein:
(i) a dispersing aid is added to the epoxy resin or dispersion at one or more point before or during any of steps (a)-(d);
(ii) the unsaturated monomers in step (b) are selected so that the resulting polymer forming the alkali soluble polymer shell has a glass transition temperature as calculated by the Fox equation of at least 60 degrees Celsius; and
(iii) the amounts of epoxy resin, unsaturated monomers and dispersing aid are selected so that the resulting aqueous redispersible epoxy polymer powder has a concentration of epoxy resin that is greater than 50 weight-percent and 90 weight-percent or less; a concentration of alkali soluble polymer shell in a range of ten to fifty weight-percent; and a total of from two to 25 weight-percent of a dispersing aid where the concentration of epoxy resin, alkali soluble polymer shell and dispersing aid are each relative to total combined weight of epoxy resin, alkali soluble polymer shell and dispersing aid such that the combined weight-percents of epoxy resin, alkali soluble polymer shell and dispersing aid is 100 weight-percent.

9. The method of claim 8, wherein at least a portion of the unsaturated monomers are mixed with the epoxy resin prior to step (a).

10. The method of claim 8, wherein at least a portion of unsaturated monomers are fed into the initial epoxy dispersion during step (c).

11. The method of claim 8, wherein methyl methacrylate is added to the epoxy resin prior to step (a) and methacrylic acid is added as an unsaturated monomer after step (a) and during or prior to step (c).

12. The method of claim 8, wherein step (a) includes providing an epoxy resin in a softened state and feeding the softened epoxy resin into an aqueous phase while applying shear to disperse the epoxy.

13. The method of claim 8, further characterized by forming in step (d) aqueous redispersible epoxy polymer powder that upon redispersing in an aqueous medium having a pH in a range of 9-11 produces a dispersion of epoxy particles having an average particle size of two microns or less.

14. The method of claim 8, wherein step (d) requires spray drying the epoxy resin particles while introducing an anti-caking agent.

* * * * *